Figure 8:
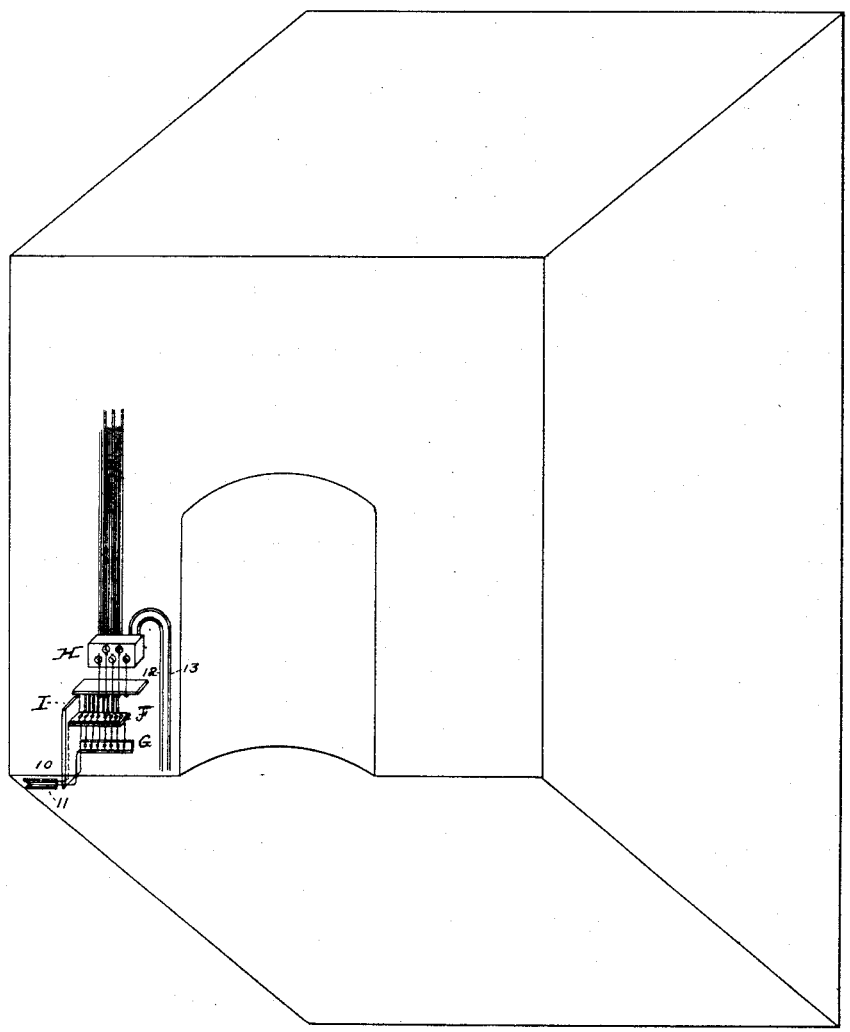

(No Model.) 4 Sheets—Sheet 1.
L. STIERINGER & J. H. VAIL.
HOUSE WIRING FOR ELECTRIC LIGHTS.
No. 343,087. Patented June 1, 1886.
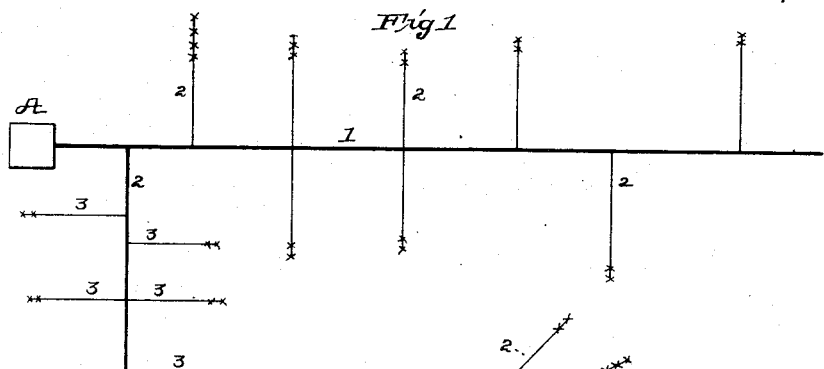
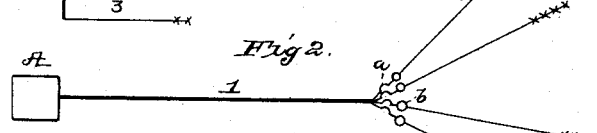
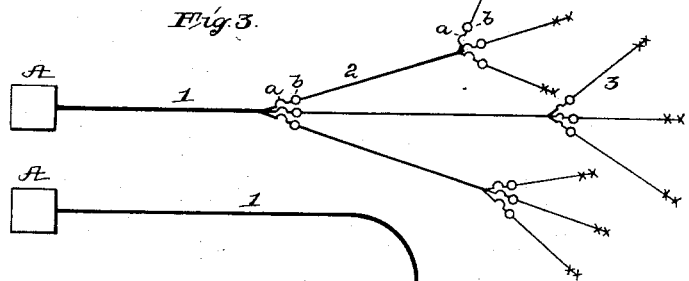
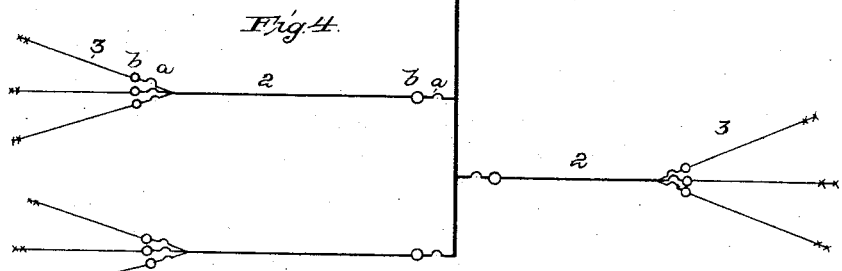
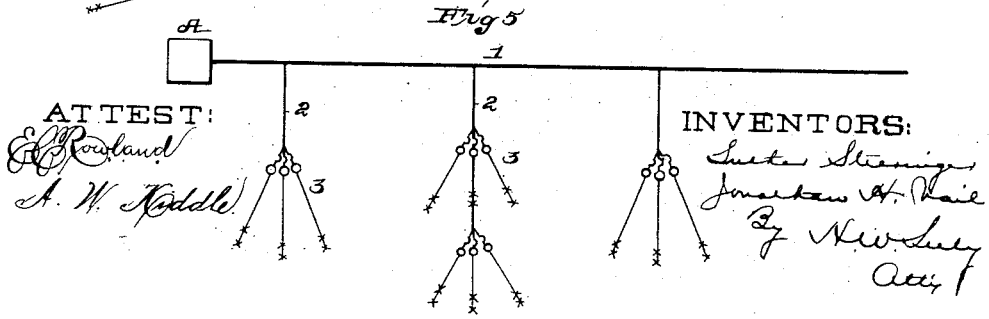
ATTEST: INVENTORS:

(No Model.) 4 Sheets—Sheet 2.
L. STIERINGER & J. H. VAIL.
HOUSE WIRING FOR ELECTRIC LIGHTS.
No. 343,087. Patented June 1, 1886.
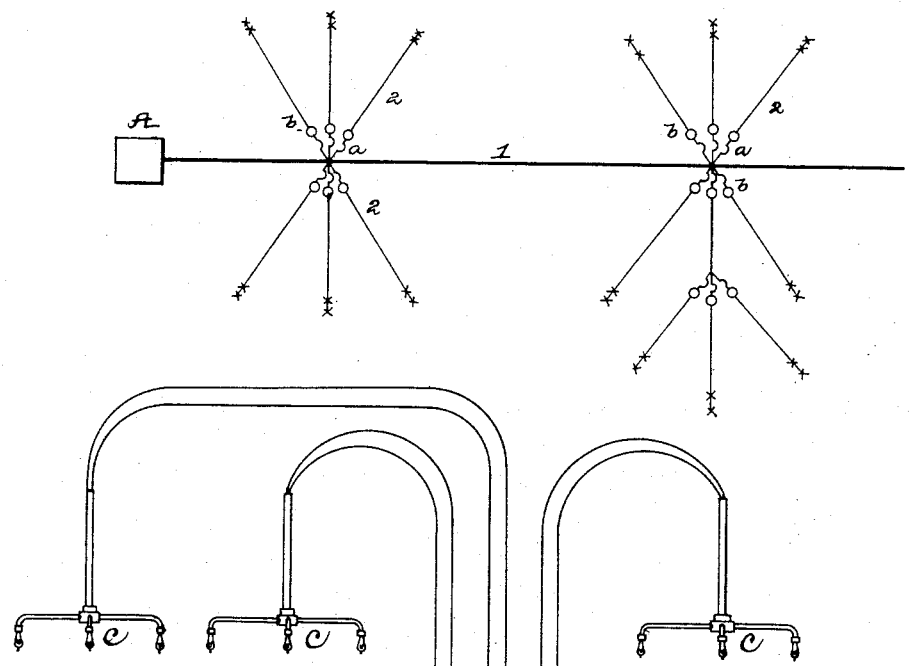
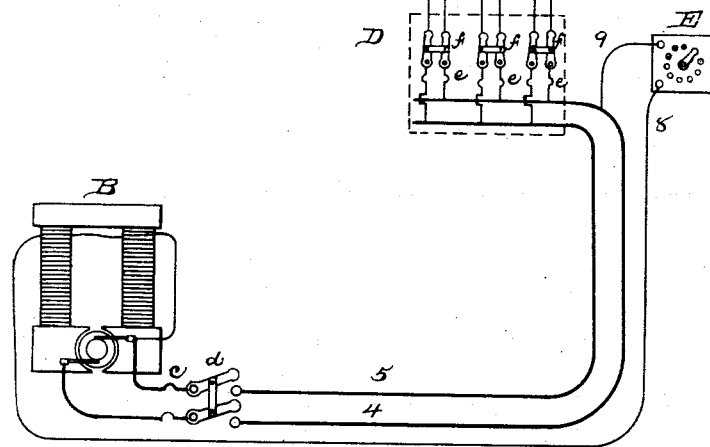
ATTEST INVENTORS (No Model.)  L. STIERINGER & J. H. VAIL.  4 Sheets—Sheet 3.
HOUSE WIRING FOR ELECTRIC LIGHTS.

No. 343,087. Patented June 1, 1886.

ATTEST:
E. C. Rowland
A. W. Kiddle

INVENTORS:
Luther Stieringer
Jonathan H. Vail
By __ Atty

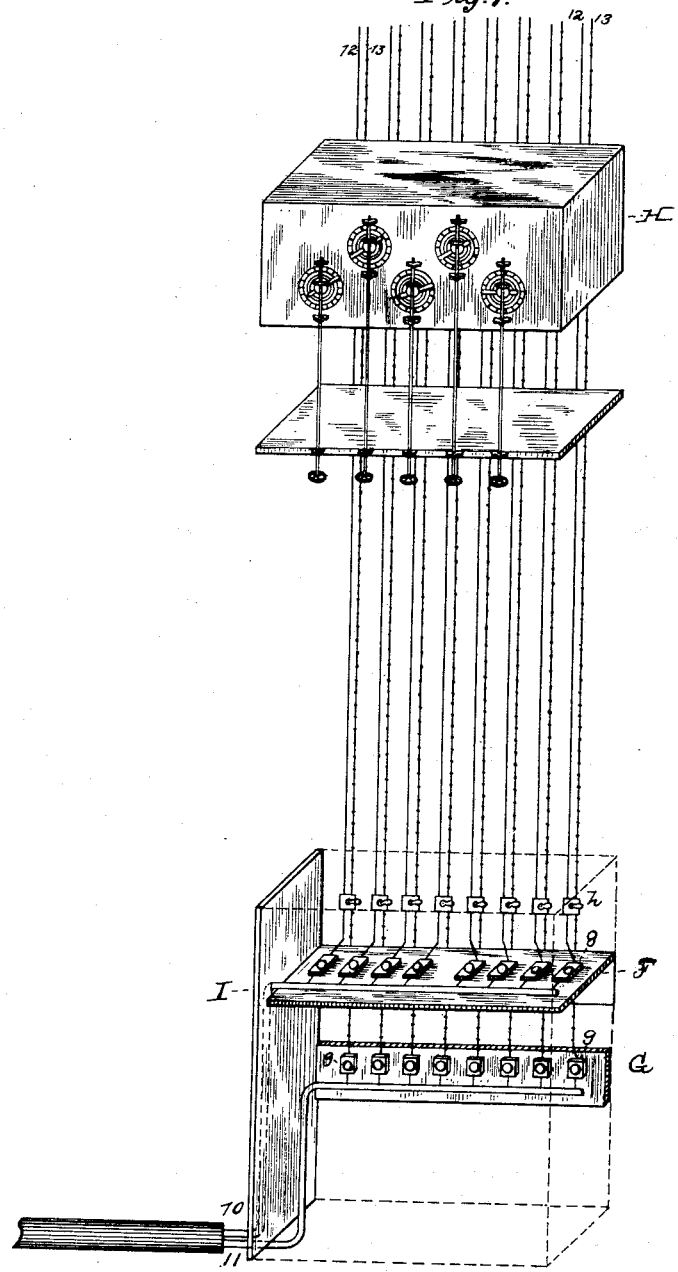

UNITED STATES PATENT OFFICE.

LUTHER STIERINGER AND JONATHAN H. VAIL, OF NEW YORK, N. Y.

HOUSE-WIRING FOR ELECTRIC LIGHTS.

SPECIFICATION forming part of Letters Patent No. 343,087, dated June 1, 1886.

Application filed July 1, 1884. Serial No. 136,518. (No model.)

*To all whom it may concern:*

Be it known that we, LUTHER STIERINGER and JONATHAN H. VAIL, both of New York city, in the county and State of New York, have invented a certain new and useful Improvement in House-Wiring for Electric Lights, of which the following is a specification.

The object we have in view is to produce a system of wiring houses, vessels, or the interior of other structures for incandescing electric lamps arranged in multiple arc or multiple series, wherein there will be a complete and independent control and protection of all the circuits, so that they can be separately made and broken for turning on and off the lights, and properly inspected and tested for "grounds," cross-connections, or imperfect insulation or contacts, and so that the danger of injury by the heating of the conductors will be entirely obviated by the protection of both poles of each circuit by fusible safety-catches wherever a smaller conductor branches from a larger one, all this with the smallest possible number of switches and safety-catches. The conductors will be of the minimum size and cost, reducing the expense of installation. There will be the minimum number of changes in the size of the conductors, so as to simplify greatly the calculations of sizes of conductors and the preparation of proper plans, and to render the work easy of execution by workmen of ordinary intelligence. There will be a proper and equal distribution of current upon the conductors and to the lamps, maintaining all the lamps at normal incandescence practically independent of lamps in other circuits or divisions of the same circuit, and not taxing any conductor unduly or beyond a safe current-carrying limit, and there will be a convenient location of switches and safety-catches for operation of the switches for testing circuits for repairs, and for replacement of safety-catches.

The invention also includes means for regulating the candle-power of the lamps where the building is provided with its own dynamo or dynamos at a distance from the machine or machines and convenient to the switches for controlling the lights, and also the special application of the features of the invention to the lighting of theaters.

In general our system of house-wiring may be stated to be a system of distribution and control, as distinguished from the system of circulation heretofore employed. In the latter system the main conductors are run past all the "outlets" or points where the wires run into fixtures and the branch lamp-circuits are taken from the main conductors at all points along their length, and are run by the shortest paths from the outlets to the mains.

The general principle of our system of distribution and control is to take all branch circuits from each pair of main conductors at one point, and, if necessary, to divide a pair of branch conductors to take all sub-branches from the branch conductors at one point, and so on to any extent of subdivision that it may be found desirable to carry the wiring. The conductors of each main are protected at the machine or machines or at the street-connection (if in a general system) by double-pole safety-catches, and are there controlled by switches, which are also preferably double pole, and at each point of departure of branch conductors from the mains or of sub-branches from branches each circuit is protected by a double-pole safety-catch and controlled by a double-pole switch, and the several safety catches and switches for each point of departure of branches from mains or sub-branches from branches are assembled together.

The system of circulation heretofore employed has many practical disadvantages and defects, which are overcome and obviated by our system of distribution and control.

The features of the invention are applicable to house-wiring, whether the wires are concealed or are carried along the surface of walls and ceilings, but while exposed work may be done imperfectly and more expensively by a system of circulation, it is practically impossible to do "concealed" work in this way, and provide accessible switches and safety-catches for all the circuits, and hence the invention has especial advantages in its application to concealed work.

In carrying out our invention we divide the lamps of a house, or any portion thereof to be lighted, between as many pairs of main conductors (one or more) as the number of lamps and the distances from the dynamo or dynamos, or the street-connection (if in a general system) will require in order that the conductors of each main can be of a conveniently-small size for proper handling in doing the work, and for concealment, if desired. We prefer in practice to use main conductors no larger than No. 3 or 4 copper wire B. W. G., and smaller sizes; but larger conductors may be employed without departing from the spirit of our invention. Each pair of main conductors is provided at the machine or machines or at the street-connection with a safety-catch in each pole or side of the circuit, properly proportioned with reference to the current-carrying capacity of the particular main conductors, to protect the main conductors and to fuse and rupture the circuit before the main conductors can be unduly or dangerously heated. Each pair of main conductors is also provided at the machine or machines or at the street-connection with a switch for making and breaking the circuit. This switch is preferably one which controls both poles or sides of the circuit, making and breaking them simultaneously. If more than one pair of main conductors is run from the machine or machines or the street-connection, the safety-catches and switches for the several mains will be assembled together. From the dynamo or dynamos or the street-connection each pair of main conductors is run without change in size to a convenient point for distribution to the lamps intended to be supplied by it, preferably to as central a point as possible which is convenient of access. These main conductors may be calculated for any loss desired, the "drop" in tension upon them not affecting the equal distribution to the lamp-circuits. With the ends of the main conductors are connected several (two or more) branch lamp-circuits, each one of which extends to a chandelier, bracket, or other fixture carrying one or more incandescing electric lamps. If the fixtures carry a small number of lamps each, (one or two,) one branch circuit may extend to two or more fixtures, and, conversely, if a fixture contains a large number of lamps, two or more branch circuits may be run to the same fixture. The main conductors are of uniform and undiminished size from the machine or street-connection to the point of delivery to the branch circuits. The conductors of the branch circuits are smaller than the main conductors. A sufficient number of branch circuits are provided so that the number of lamps carried by each will not be large, enabling the use of a conveniently-small wire, which can be readily handled and easily concealed. We prefer to use no larger than No. 12 or 14 copper wire, B. W. G., for branch lamp-circuits, and smaller sizes, although larger sizes of wire can be employed without departing from the spirit of our invention. At the point of departure of the branches from the mains each branch circuit is provided with a double-pole safety-catch, properly proportioned to the current-carrying capacity of the particular branch, since the branches vary in size according to the number of lamps they are designed to carry, and each branch is also controlled at that point by a switch, preferably double pole. The several safety-catches and switches are assembled together, and are preferably located in a common inclosing-box. A more extensive subdivision of the conductors may be employed—as, for instance, a pair of mains running from the machine or machines or street-connection may at its end have several branches taken for the different sections of the building, and from the end of each branch several sub-branches may be run to different rooms or portions of rooms, and from the ends of each sub-branch several branch lamp-circuits may be run to fixtures in the room.

To whatever extent of subdivision the system is carried the same principle of distribution, protection, and control is employed throughout. For an extensive subdivision, such as has just been described, the main conductors may be quite large. They may be rods of copper inclosed in iron tubing, but the branches and sub-branches and final lamp-branch circuits will be of wire which can be conveniently handled and concealed. The final fixture or lamp-circuits are calculated for a small loss, (say two per cent.) which in practice will differ but slightly or not at all in the fixture-circuits of a house, and since no current is taken from the mains or branches up to the point of delivery to the lamp or fixture circuits, the difference in candle-power of the lamps will be only the difference in drop upon the final fixture or lamp circuits to the outlets, the total drop upon which is so small that the difference if any between two circuits will be unimportant.

We prefer to take our branches from the mains or sub-branches from branches at the extreme ends of the mains or branches; but it is evident that the same practical result would be obtained if the connections were somewhat separated upon the mains or branches, provided the distance from the machine or house-connection to the first branch, or from the point of departure from the mains to the first sub-branch is a much greater length than from the first to the last branch or sub-branch.

Our system is also capable of partial application. If the distance is short, and the additional cost of the main conductors not important, a pair of main conductors may be provided large enough to permit branches to be taken at any point along its length. Each branch may run to a center of distribution, and there be divided into sub-branches with safety-catches and switches in accordance with our invention. As an illustration of this partial application of the invention, the case of a small house in which it is desirable to run only one vertical main may be considered. If this main is large enough, a branch can be taken off at each floor, protected by a safety-catch, and controlled by a switch, and this branch will be run to a center of distribution for the floor, and at that point the several lamp or fixture circuits will be run from the branch with their separate safety-catches and switches; or a pair of main conductors—such as a vertical or floor main—may run to two or more centers of distribution and have several branch circuits taken from it at each of such centers, with safety-catches and switches assembled at that point; but this manner of wiring has only part of the advantages that are possessed by our system when carried out in all its details.

For enabling the lights to be regulated at the point where they are controlled when the building is provided with its own dynamo, we place a regulating resistance at that point and connect it with the field-magnet circuit of the distant dynamo. One of the main conductors may be utilized, requiring the running of only one extra wire from the machine to the resistance-box, or two extra wires may be used. An automatic regulator can be employed, instead of a hand-operated resistance.

For theater-lighting we run a pair of main conductors from the dynamo or dynamos or the street-connection to the stage upon one side, and from that point we run branch circuits for the auditorium and stage lights. Each branch has its double pole, safety catch, and switch, and these are all inclosed in a suitable case. Each lamp-circuit (or part of them) will be provided with an adjustable resistance for turning the lights up and down. The resistance-box will be located at this same point, so that all the circuits will be under control from the one point at the side of the stage.

In the accompanying drawings, forming a part hereof, Figure 1 is a diagram illustrating the principle of a system of circulation; Fig. 2, a diagram illustrating the principle of our system of distribution and control; Fig. 3, a diagram showing a more extensive subdivision of the conductors; Fig. 4, a diagram showing a somewhat separated connection of the branches with the mains; Figs. 5 and 6, diagrams illustrating partial applications of our system; Fig. 7, a view, partly in diagram, of a simple system of distribution and control, showing some details of the work; Figs. 8 and 9, views illustrating the application of the invention to theater-lighting.

In Figs. 1 to 6, inclusive, the squares A represent dynamo-electric machines, which, if the house or building is in a district supplied by a central station, will be substituted by a connection with the street-conductors. 1 represents mains, 2 branches, 3 sub-branches, and $x$ incandescing electric lamps. The single lines representing the conductors are intended to represent each a pair of conductors, complete metallic circuits being employed. The semicircles $a$ represent double-pole-safety catches, while the circles $b$ represent double-pole switches. With this explanation and the description before given, the diagrams, Figs. 1 to 6, inclusive, will be readily understood, Fig. 1 showing a system of circulation not covered by our invention, and Figs. 2, 3, 4, 5, and 6 showing systems of distribution and control, or partial distribution and control, embracing our invention.

In Fig. 7, B is a dynamo-electric machine from which extend main conductors 4 5, having the double-pole safety-catch $c$ and double-pole switch $d$. This safety-catch is composed of two links of readily-fusible metal placed one in each conductor 4 5. The semicircles $c$ represent these links. The double-pole switch $d$ is shown in a conventional form for illustration. At the ends of the mains three branch circuits, 6 7, are taken, extending to fixtures C. These branch circuits have double-pole safety-catches $e$ and switches $f$, and these are assembled together and inclosed by a box, D, (shown in dotted lines,) which may be sunken in the wall or otherwise conveniently located. The resistance-box E is also located at this point, and is connected with the field-magnet by wire 8, and with main conductor 4 by wire 9, the main conductor being utilized for part of the circuit between the field-magnet and the resistance-box.

In Figs. 8 and 9, 10 11 are the main conductors extending to one side of the stage, as shown in Fig. 8, which is a view from the back of the stage looking toward the auditorium. Here the ends of the conductors are laid bare and run out upon the boards F G. The branch circuits 12 13 are run from these boards and have double-pole safety-catches $g$ and switches $h$. A resistance-box, H, including part or all of the circuits, is located here also, and is used for turning the lights up and down. The electrical connections (the safety catches and switches) are inclosed in a box, I, represented partly in full and partly in dotted lines. For lamps in multiple series the same manner of wiring will be employed, the two or more lamps of each series being treated the same as each lamp of a multiple-arc arrangement.

What we claim is—

1. In wiring interiors for electric lamps, the combination, with main or branch conductors, of several independent lamp or fixture circuits taken from the main or branch conductors at the same point, all such conductors being in pairs and forming complete or round metallic circuits, substantially as set forth.

2. In wiring interiors for electric lamps, the combination, with main or branch conductors extending to a center of distribution, of several independent lamp or fixture circuits taken from the main or branch conductors at said center of distribution, all such conductors being in pairs and forming complete or round metallic circuits, substantially as set forth.

3. In wiring interiors for electric lamps, the combination, with main or branch conductors extending to a center of distribution, of several independent lamp or fixture circuits taken from the main or branch conductors at said center of distribution, all such conductors being in pairs and forming complete or round metallic circuits, and a safety-catch in each of said lamp or fixture circuits at the point of departure from the main or branch conductors, substantially as set forth.

4. In wiring interiors for electric lamps, the combination, with main or branch conductors extending to a center of distribution, of several independent lamp or fixture circuits taken from the main or branch conductors at said center of distribution, all such conductors being in pairs and forming complete or round metallic circuits, and a switch in each of said lamp or fixture circuits at the point of departure from the main or branch conductors, substantially as set forth.

5. In wiring interiors for electric lamps, the combination, with main or branch conductors extending to a center of distribution, of several independent lamp or fixture circuits taken from the main or branch conductors at said center of distribution, all such conductors being in pairs and forming complete or round metallic circuits, a safety-catch in each of said lamp or fixture circuits at the point of departure from the main or branch conductors, and a switch in each of said lamp or fixture circuits at the same point, substantially as set forth.

6. In wiring interiors for electric lamps, the combination, with main or branch conductors extending to a center of distribution, of several independent lamp or fixture circuits taken from the main or branch conductors at said center of distribution, all such conductors being in pairs and forming complete or round metallic circuits, and double-pole safety-catches in each of said lamp or fixture circuits at the point of departure from the main or branch conductors, substantially as set forth.

7. In wiring interiors for electric lamps, the combination, with main or branch conductors extending to a center of distribution, of several independent lamp or fixture circuits taken from the main or branch conductors at said center of distribution, all such conductors being in pairs and forming complete or round metallic circuits, and a double-pole switch in each of said lamp or fixture circuits at the point of departure from the main or branch conductors, substantially as set forth.

8. In wiring interiors for electric lamps, the combination, with main or branch conductors extending to a center of distribution, of several independent lamp or fixture circuits taken from the main or branch conductors at said center of distribution, all such conductors being in pairs and forming complete or round metallic circuits, a double-pole safety-catch in each of said lamp or fixture circuits at the point of departure from the main or branch conductors, and a double-pole switch in each of said lamp or fixture circuits at the same point, substantially as set forth.

9. A system of wiring interiors for electric lights, with conductors in pairs forming complete or round metallic circuits, wherein the branches and sub-branches, if any, of a pair of main conductors have but one point of departure from the mains and branches, whereby the delivery of current to the lamp-circuits will be equalized, substantially as set forth.

10. A system of wiring interiors for electric lights, with conductors in pairs forming complete or round metallic circuits, wherein the branches and sub-branches, if any, of a pair of main conductors have but one point of departure from the mains and branches, in combination with safety-catches located at the points of departure of smaller from larger conductors, substantially as set forth.

11. A system of wiring interiors for electric lights, with conductors in pairs forming complete or round metallic circuits, wherein the branches and sub-branches, if any, of a pair of main conductors have but one point of departure from the mains and branches, in combination with switches for controlling all the circuits at each point of departure, assembled together, substantially as set forth.

12. A system of wiring interiors for electric lights, with conductors in pairs forming complete or round metallic circuits, wherein the branches and sub-branches, if any, of a pair of main conductors have but one point of departure from the mains and branches, in combination with safety-catches for protecting all the circuits and switches for controlling all the circuits at each point of departure, assembled together, substantially as set forth.

13. In wiring interiors for electric lights, the combination, with a self-exciting dynamo supplying electric lamp-circuits, of a regulator for said dynamo located at a distance therefrom and connected therewith by a single extra conductor and by one of the lamp-circuit conductors, substantially as set forth.

This specification signed and witnessed this 21st day of June, 1884.

LUTHER STIERINGER.
    JONATHAN H. VAIL.

Witnesses:
 A. W. KIDDLE,
 E. C. ROWLAND.